United States Patent
Kumar et al.

(10) Patent No.: US 12,360,856 B2
(45) Date of Patent: Jul. 15, 2025

(54) CREATING A TRANSACTIONAL CONSISTENT SNAPSHOT COPY OF A SQL SERVER CONTAINER IN KUBERNETES

(71) Applicant: Dell Products L.P., Round Rock, TX (US)

(72) Inventors: Sunil Kumar, Bangalore (IN); Animesh Tamrakar, Bangalore (IN); Shruthi Sreedharan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 207 days.

(21) Appl. No.: 17/953,676

(22) Filed: Sep. 27, 2022

(65) Prior Publication Data

US 2024/0103980 A1    Mar. 28, 2024

(51) Int. Cl.
    *G06F 11/14* (2006.01)
(52) U.S. Cl.
    CPC ...... *G06F 11/1464* (2013.01); *G06F 2201/84* (2013.01); *G06F 2209/505* (2013.01)
(58) Field of Classification Search
    CPC ............. G06F 11/1464; G06F 2201/84; G06F 2209/505
    See application file for complete search history.

(56) References Cited

U.S. PATENT DOCUMENTS

| | | | | |
|---|---|---|---|---|
| 11,561,866 | B2 * | 1/2023 | Mitkar | G06F 11/2038 |
| 2015/0324216 | A1 * | 11/2015 | Sizemore | G06F 9/45558 718/1 |
| 2021/0303522 | A1 * | 9/2021 | Periyagaram | G06F 16/178 |
| 2022/0043724 | A1 * | 2/2022 | Lee | G06F 11/1469 |
| 2023/0418651 | A1 * | 12/2023 | Prabhu | G06F 9/45558 |

\* cited by examiner

*Primary Examiner* — Ken Hoang

(74) *Attorney, Agent, or Firm* — Staniford Tomita LLP

(57) ABSTRACT

Embodiments for creating transactional consistent snapshot copies of SQL server containers in a Kubernetes system for copy reuse on different clusters to facilitate processing local snapshots for secondary workloads without impacting production quality of service. A copy data management (CDM) tool acts as an orchestrator, while a backup toolkit is deployed in the namespace of the production cluster containers. A container storage interface (CSI) plugin supplies persistent storage to the containers. Before taking a copy, the process posts the toolkit in the container and a quiesce/unquiesce operation is then performed. The databases are first quiesced, the snapshot copy is taken, and then the databases are unquiesced. The toolkit is then removed, thus producing a transactional consistent backup in a different namespace.

20 Claims, 10 Drawing Sheets

US 12,360,856 B2

CREATING A TRANSACTIONAL CONSISTENT SNAPSHOT COPY OF A SQL SERVER CONTAINER IN KUBERNETES

TECHNICAL FIELD

Embodiments relate to distributed networks, and specifically to transactional consistent snapshot copying of SQL server containers in a Kubernetes system for copy reuse.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Clustered network systems represent a scale-out solution to single node systems by providing networked computers that work together so that they essentially form a single system. Each computer forms a node in the system and runs its own instance of an operating system. The cluster itself has each node set to perform the same task that is controlled and scheduled by software. Such networks use a distributed file system in which data may be spread across multiple storage devices as may be provided in a cluster. The distributed file system can present a global namespace to clients in a cluster accessing the data so that files appear to be in the same central location. Distributed file systems are typically very large and may contain many hundreds of thousands or even many millions of files, as well as services (applications) that use and produce data.

Relational databases using the structured query language (SQL) to create, store, update, and retrieve data are a significant application in clustered networks. The Kubernetes management system for containers has been developed to automate and scale the deployment of resources in highly available SQL database clusters. Running SQL in containers uses an SQL server in which container images contain the files needed for the SQL server engine, the server agent, built-in features (e.g., replication), and command-line tools.

In a Kubernetes environment, a SQL server container is deployed using persistent volumes that are generally provisioned by container storage interface (CSI) drivers of respective external storage system vendors. Currently Kubernetes does not provide any solution to create a local transactional consistent copy of production SQL server application pods and then enable this copy to recover the application to a different Kubernetes cluster using space efficient local snapshots of the underlying storage system. This limitation is primarily due to two main issues. First, there are no default tools shipped by Microsoft (or other vendors) or Kubernetes to enable dev ops personas to create a transactional consistent copy of MS SQL server pods. Second, the Kubernetes CSI specification makes a local snapshot in the same namespace as the production persistent volumes, and it cannot be moved to another namespace or cluster without copying the entire set of snapshots, which is a very costly and time-consuming operation. This kind of operation is very much required for secondary workloads like backup, test/dev, reporting and analytics, as using production deployment pods and clusters are not preferred as it may negatively impact the quality of service (QoS) of the production application.

What is needed, therefore, is a system and method to create transactional consistent snapshot copies of SQL server containers in Kubernetes for copy reuse among different Kubernetes clusters.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Dell and EMC are trademarks of Dell/EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
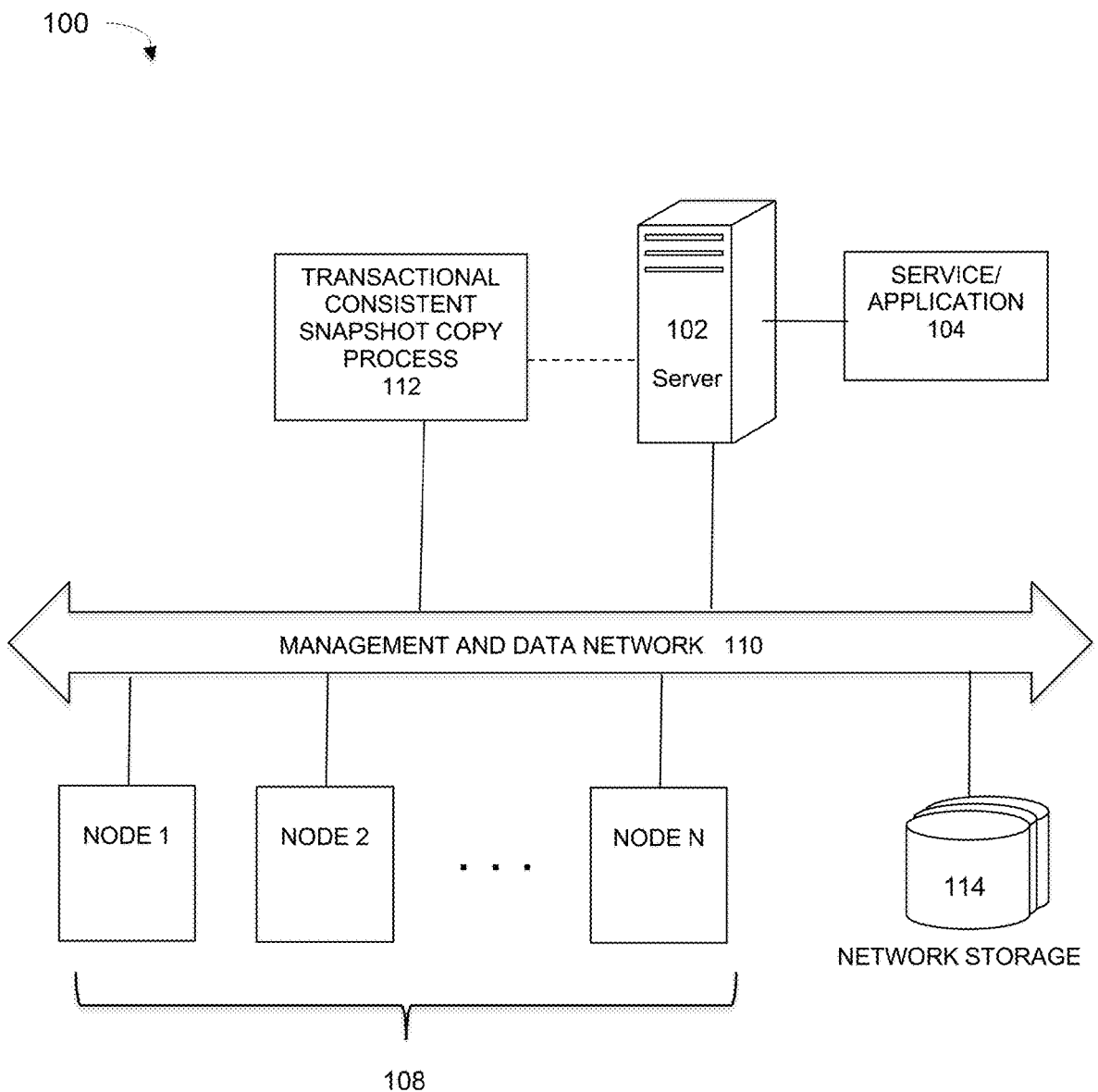
FIG. 1 is a block diagram of illustrating a transactional consistent snapshot copy process for Kubernetes, under some embodiments.

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. In this specification, these implementations, or any other form that the invention may take, may be referred to as techniques. In general, the order of the steps of disclosed processes may be altered within the scope of the described embodiments.

Embodiments are directed to a system and method that can be used to create transactional consistent snapshot copies of SQL server containers in a Kubernetes environment for copy reuse on different clusters so as to facilitate enabling local snapshots for secondary workloads (i.e., non-production workloads such as backup, test/dev, reporting and analytics) without impacting production quality of service.

FIG. 1 is a block diagram of illustrating a distributed system implementing a transactional consistent snapshot copy process, under some embodiments. System 100 comprises a large-scale network that includes a number of different devices, such as server or client computers 102, nodes 108, storage devices 114, and other similar devices or computing resources. Other networks may be included in system 100 including local area network (LAN) or cloud networks, and virtual machine (VM) storage or VM clusters. These devices and network resources may be connected to a central network, such as a data and management network 110 that itself may contain a number of different computing resources (e.g., computers, interface devices, and so on). FIG. 1 is intended to be an example of a representative system implementing a distributed computing system under some embodiments, and many other topographies and combinations of network elements are also possible.

A distributed system typically consists of various components (and processes) that run in different computer systems (also called nodes) that are connected to each other. These components communicate with each other over the network via messages and based on the message content, they perform certain acts like reading data from the disk into memory, writing data stored in memory to the disk, perform some computation (CPU), sending another network message to the same or a different set of components and so on. These acts, also called component actions, when executed in time order (by the associated component) in a distributed system would constitute a distributed operation.

A distributed system may comprise any practical number of compute nodes 108. For system 100, n nodes 108 denoted Node 1 to Node N are coupled to each other and server 102 through network 110. These client compute nodes may include installed agents or other resources to process the data of application 104. The application at the server 102 communicates with the nodes via the control path of network 110 and coordinates with certain agent processes at each of the nodes 108 to perform application functions of the distributed file system.

The network 110 generally provide connectivity to the various systems, components, and may be implemented using protocols such as Transmission Control Protocol (TCP) and/or Internet Protocol (IP), well known in the relevant arts. In a cloud computing environment, the applications, servers and data are maintained and provided through a centralized cloud computing platform.

For the example network environment 100 of FIG. 1, server 102 is an application server that executes one or more applications or processes 104 that processes data in the system using one or more nodes 108. One typical application is a data backup management application that coordinates or manages the backup of data from one or more data sources, such as other servers/clients to storage devices, such as network storage 114 and/or virtual storage devices, or other data centers. The data generated or sourced by system 100 may be stored in any number of persistent storage locations and devices, such as local client or server storage. The storage devices represent protection storage devices that serve to protect the system data through applications 104, such as a backup process that facilitates the backup of this data to the storage devices of the network, such as network storage 114, which may at least be partially implemented through storage device arrays, such as RAID (redundant array of independent disks) components.

In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays for use by a backup server, such as a server that may be running Networker or Avamar data protection software backing up to Data Domain protection storage, such as provided by Dell/EMC' Corporation.

As shown in FIG. 1, system 100 includes a process 112 that creates transactional consistent snapshot copies of SQL server containers in the Kubernetes system 100 for copy reuse on different clusters so as to facilitate processing local snapshots for secondary workloads (i.e., non-production workloads) without impacting the quality of service of the production workloads.

In an embodiment, the SQL server 102 is a Microsoft (MS) SQL server, which is a relational database management system database server for storing and retrieving data as requested by other applications, and which may be run on a single node or across a network of computers. Embodiments are not so limited, however, and any similar SQL or database server may be used.

As shown in FIG. 1, process 112 may be a process executed by a specialized node as a specially configured management or control node in system 100. Alternatively, it may be executed as a server process, such as by server 102 or any other server or client computer in the system. The transaction (or transactional) consistent copy process 112 works with the other components of the distributed system and may use certain services or agents that run on each compute node 108 in the distributed system, such as may be implemented as a daemon process running in each node. As understood, a daemon is a computer program that runs as a background process, rather than being under the direct control of an interactive user.

In an embodiment, system 100 uses Kubernetes as an orchestration framework for clustering the nodes 1 to N in FIG. 1. Application containerization is an operating system level virtualization method for deploying and running distributed applications without launching an entire VM for each application. Instead, multiple isolated systems are run on a single control host and access a single kernel. The application containers hold the components such as files, environment variables and libraries necessary to run the desired software. Because resources are shared in this way, application containers can be created that place less strain on the overall resources available.

Containerization technology involves encapsulating an application in a container with its own operating environment, and the well-established Docker program deploys containers as portable, self-sufficient structures that can run on everything from physical computers to VMs, bare-metal servers, cloud clusters, and so on. The Kubernetes system manages containerized applications in a clustered environment to help manage related, distributed components across varied infrastructures. Certain applications, such as multi-sharded databases running in a Kubernetes cluster, spread data over many volumes that are accessed by multiple cluster nodes in parallel. For application consistency, programs, such as DLM, must be able to guarantee cross-cluster consistency in the context of an application consistent execution.

In an embodiment, the container management layer 104 is implemented as a Kubernetes platform, which is an open-source platform for automating deployments, scaling, and operations of application containers across clusters of hosts, providing container-centric infrastructure. In a Kubernetes system, a cluster consists of at least one cluster master and multiple worker machines called nodes. A cluster is the foundation the system and the Kubernetes objects that represent the containerized applications all run on top of a cluster.

Figure 2:
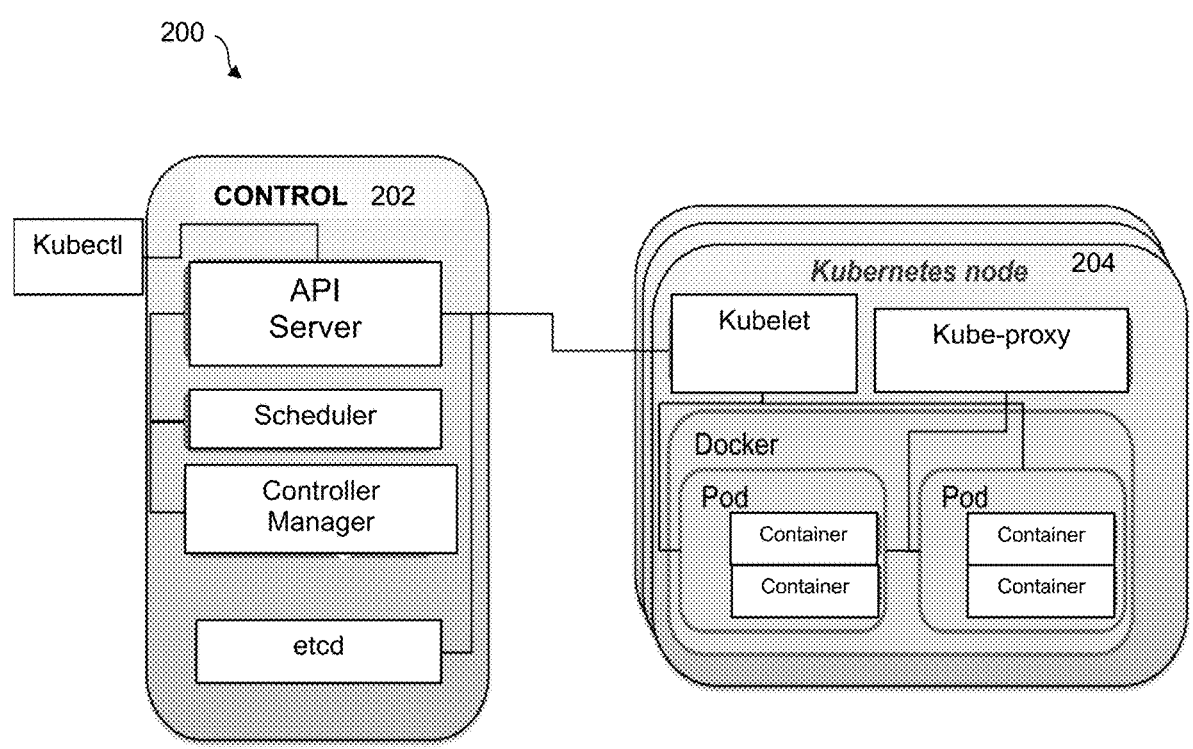
FIG. 2 is a block diagram that illustrates the architecture of a Kubernetes platform implementing a transactional consistent snapshot copy process, under some embodiments.

FIG. 2 is a block diagram 200 that illustrates the architecture of a Kubernetes platform implementing transactional consistent snapshot copy process 112, under some embodiments. The controlling services in a Kubernetes cluster are called the control plane 202 components. These operate as the main management contact points for administrators, and also provide many cluster-wide systems for the relatively dumb worker nodes. These services can be installed on a single machine, or distributed across multiple machines. The servers running these components have a number of unique services that are used to manage the cluster's workload and direct communications across the system.

Within the control plane is an API server that allows a user to configure many of Kubernetes' workloads and organizational units. It also is responsible for making sure that the et cd store (which stores configuration data to be used by the nodes) and the service details of deployed containers are in agreement. It acts as the bridge between various components to maintain cluster health and disseminate information and commands. The API server implements a RESTful interface, which means that many different tools and libraries can readily communicate with it. A client called kubecfg is packaged along with the server-side tools and can be used from a local computer to interact with the Kubernetes cluster.

The controller manager service is a general service that has many responsibilities. It is responsible for a number of controllers that regulate the state of the cluster and perform routine tasks. For instance, the replication controller ensures that the number of replicas defined for a service matches the number currently deployed on the cluster. The details of these operations are written to etcd, where the controller manager watches for changes through the API server. When a change is seen, the controller reads the new information and implements the procedure that fulfills the desired state. This can involve scaling an application up or down, adjusting endpoints, and so on.

The scheduler assigns workloads to specific nodes in the cluster. This is used to read in a service's operating requirements, analyze the current infrastructure environment, and place the work on an acceptable node or nodes. The scheduler is responsible for tracking resource utilization on each host to make sure that workloads are not scheduled in excess of the available resources. The scheduler must know the total resources available on each server, as well as the resources allocated to existing workloads assigned on each server.

In Kubernetes, servers that perform work are known as nodes 204. Node servers have a few requirements that are necessary to communicate with the control plane components 402, configure the networking for containers, and run the actual workloads assigned to them. The first requirement of each individual node server is docker. The docker service is used to run encapsulated application containers in a relatively isolated but lightweight operating environment. Each unit of work is, at its basic level, implemented as a series containers that must be deployed.

The main contact point for each node with the cluster group is through a small service called kubelet. This service is responsible for relaying information to and from the control plane services, as well as interacting with the etcd store to read configuration details or write new values. The kubelet service communicates with the control plane components to receive commands and work. Work is received in the form of a "manifest" which defines the workload and the operating parameters. The kubelet process then assumes responsibility for maintaining the state of the work on the node server. To allow individual host subnetting and make services available to external parties, a small proxy service is run on each node server. The proxy forwards requests to the correct containers, performs load balancing, and other functions.

While containers are used to deploy applications, the workloads that define each type of work are specific to Kubernetes. Different types of 'work' can be assigned. Containers themselves are not assigned to hosts. Instead, closely related containers (that should be controlled as a single 'application') are grouped together in a pod. This association leads all of the involved containers to be scheduled on the same host. They are managed as a unit and they share an environment so that they can share volumes and IP space, and can be deployed and scaled as a single application. Pods can be thought of as a single virtual computer and is the basic building block of Kubernetes and comprises one or more containers and share storage resources, and network resources. Pods run in a shared context and share the same IP using different port for containers.

During software development, clusters are maintained for different purposes, with the main distinction being production clusters versus test/development clusters. A cluster generally consists of one or more nodes which share the same cluster name. Each cluster has a single master node which is chosen automatically by the cluster and which can be replaced if the current master node fails. Multiple nodes can be started on a single server for testing purposes, but usually there is usually one node per server.

Figure 3:
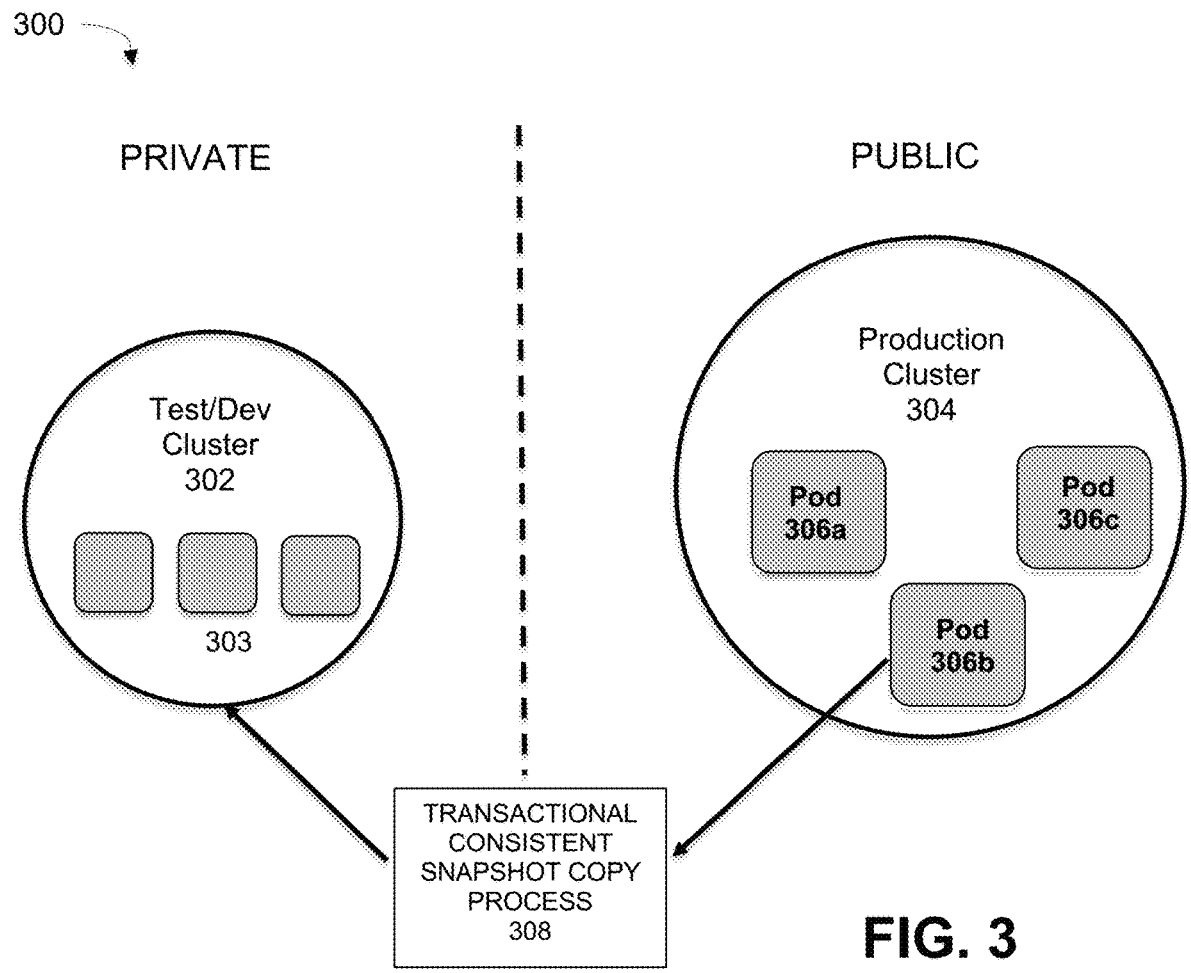
FIG. 3 is a general diagram illustrating a Kubernetes network comprising production clusters and secondary workload clusters, under some embodiments.

FIG. 3 is a general diagram illustrating a Kubernetes network comprising production clusters and secondary workload clusters, under some embodiments. As shown in FIG. 300, a production cluster 304 typically comprises a single cluster that is used for business purposes, such as hosting production datasets. Production datasets are real-world data that is regularly collected by running user and business applications, as opposed to data used for sampling and testing. Production datasets are put into operation for their intended use and may be accessible by external stakeholders (customers, suppliers etc.). Clusters that are not used for business purposes are generally referred to as "non-production" clusters, and facilitate the production clusters. Such secondary use clusters are typically not accessible by end users.

Common non-production clusters primarily comprise test and development (test/dev) clusters (e.g., test/dev cluster 302), which are used to develop and debug software without compromising actual or sensitive data, or using production resources. A development environment may contain several different versions of a program or update being developed and tested, while the production environment contains just the final version of the product in order to avoid any confusion or data access vulnerabilities. The test environment thus allows developers to see how a program will behave in a live environment. To be effective in this regard, the testing environment should closely resemble the production environment, without accessing it in any way that exposes it to vulnerabilities and co-mingling of data and applications. Other non-production clusters include clusters used for backup and restore operations (e.g., a failover cluster that provides standby functions for a current production cluster), clusters that are used for analytical purposes, and so on.

As stated above, in a Kubernetes environment, containers for a SQL server, such as a Microsoft (MS) server, Oracle server, etc. are deployed using persistent volumes, which are generally provisioned by CSI drivers of respective external storage system vendors. Current Kubernetes implementations do not create a local transactional consistent copy of production SQL server application pods and then enable this copy to recover the application to a different cluster. Such a capability is desirable since the test environment should match the production environments as closely as possible, and any current snapshot technology creates snapshots in the production cluster itself, which can negatively impact the QoS of the production application.

Embodiments of system 300 through process 308 overcome the limitations imposed by Kubernetes and create a transactional consistent copy using storage system local snapshot to meet the requirements for certain example use cases described below. Process 308 provides a method to create a transactional consistent local snapshot copy of MS SQL server pods (e.g., pod 306b) and then enables the local snapshot to be used on a different Kubernetes cluster, such as a pod 303 on test/dev cluster 302. This enable process essentially 'ingests' the application-aware copy as a transaction consistent copy in or to the different container. This allows the system to recover SQL server pods, thus providing a fast and space efficient mechanism to get a copy of the production application deployed in Kubernetes for test/dev workloads, or other secondary workloads, such as analytics, backup, restore, failover, and so on.

In a Kubernetes environment, a namespace is generally provisioned under which all SQL server pods are deployed along with network, security and other configurations. SQL server pods in such deployments have persistent storage attached to it and require special handling while creating copy. In present systems, snapshots of a volume using CSI are tied to the same (only one) namespace, and a system cannot use the snapshot to create another namespace. Embodiments overcome this limitation by allowing a transactional consistent local snapshot copy from one namespace (e.g., production SQL server) to be made on a different namespace (e.g., test/dev cluster), as shown in FIG. 3.

Figure 4:
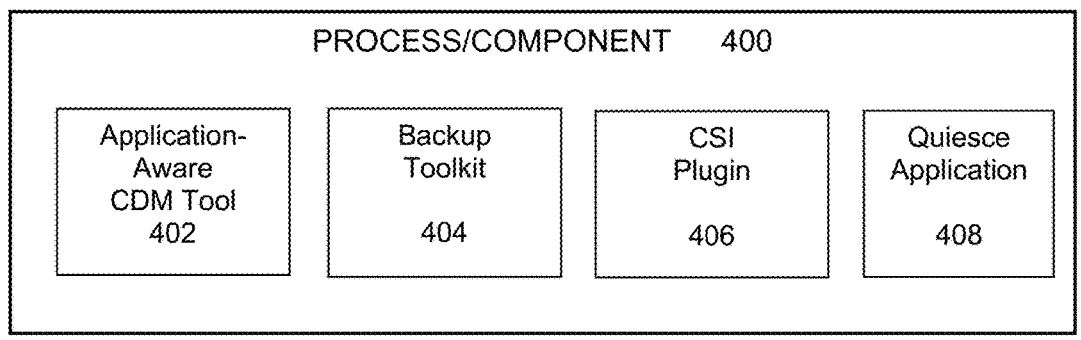
FIG. 4 is a block diagram that illustrates functional components for a transactional consistent snapshot copy process for distributed networks, under some embodiments.

FIG. 4 is a block diagram that illustrates functional components for a transactional consistent snapshot copy process for distributed networks, under some embodiments. As shown in FIG. 4, process/component 400 comprises four high level components: an application-aware copy data management (CDM) tool (e.g., Dell EMC AppSync) 402; backup toolkit 404 (e.g., VMware Velero) to copy the deployed stateful application metadata at any point-in-time; a CSI plugin from respective storage system vendor, 406; and a C/C++ based low-footprint application ("app") 408, which is used by CDM tool 402 to quiesce the MS SQL server database before creating snapshot and thaw once snapshot copy is done. The application 408 lifecycle (push/remove) is managed by CDM tool 406 as part of the copy creation and copy recovery process and the application is designed to run as background process during its lifetime.

The CDM tool 402 is essentially an orchestrator tool, while the backup toolkit 404 is deployed in the namespace of the containers. The CSI plugin 406 supplies persistent storage to the containers. Before taking a copy, the process posts the toolkit 404 in the container and a quiesce/unquiesce operation is then performed. The databases are first quiesced, the snapshot copy is taken, and then the databases are unquiesced, and then the toolkit 404 is removed. This produces a transactional consistent backup in a different namespace.

Figure 5:
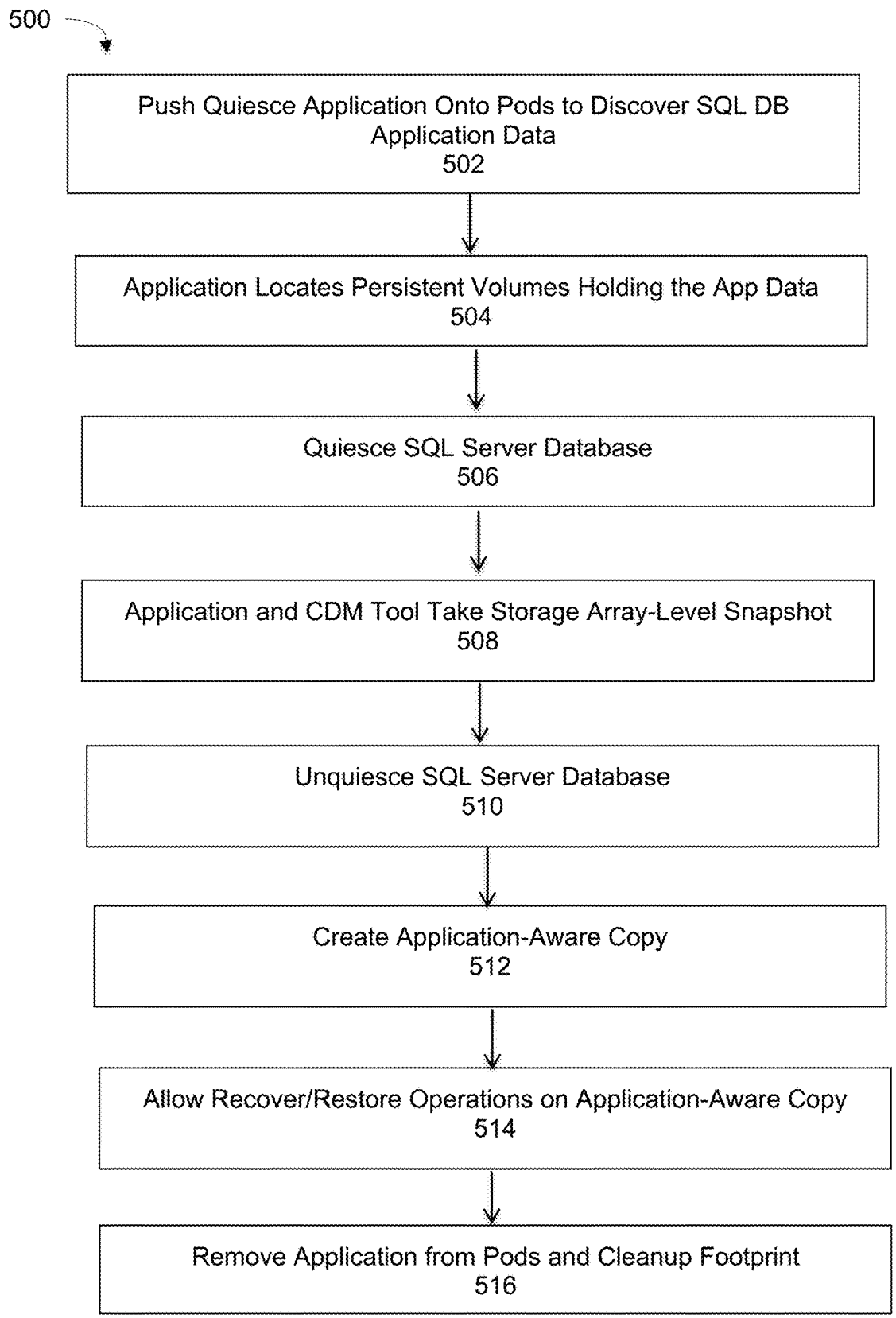
FIG. 5 is a flowchart that illustrates a method of an application created to quiesce and unquiesce an MS SQL server inside a Kubernetes pod, under some embodiments.

FIG. 5 is a flowchart that illustrates an application process to quiesce and unquiesce an MS SQL server inside a Kubernetes pod, under some embodiments. As shown in process 500, the application 408 is first pushed onto the pods to discover the SQL server database(s) application data, 502. It then locates the persistent volumes on which the data resides, 504, and quiesces or freezes (i.e., temporarily stops I/O operations on the application) the SQL server database (s), 506. The application then collaborates with the CDM tool 402 to take a storage array-level volume snapshot, 508. It then unquiesces or thaws (e.g., reinitiates the I/O operations on) the SQL server database(s), 510 to create an application-aware copy of the storage array-level volume, 512. It also allows for recovery/restore operations from this application-aware copy, 514. The SQL application 408 consist of scripts and other program elements (explained in greater detail below) to initiate discovery (discovery.sh), freeze (freeze.sh), thaw (thaw.sh), download backup metadata and recovery (recovery.sh) along with the main background process (e.g., SQL client) which performs the actual SQL server-aware operations. At the end of the copy and recovery operation, this application is removed from the pod and the footprint is cleaned up, 516.

Figure 6:
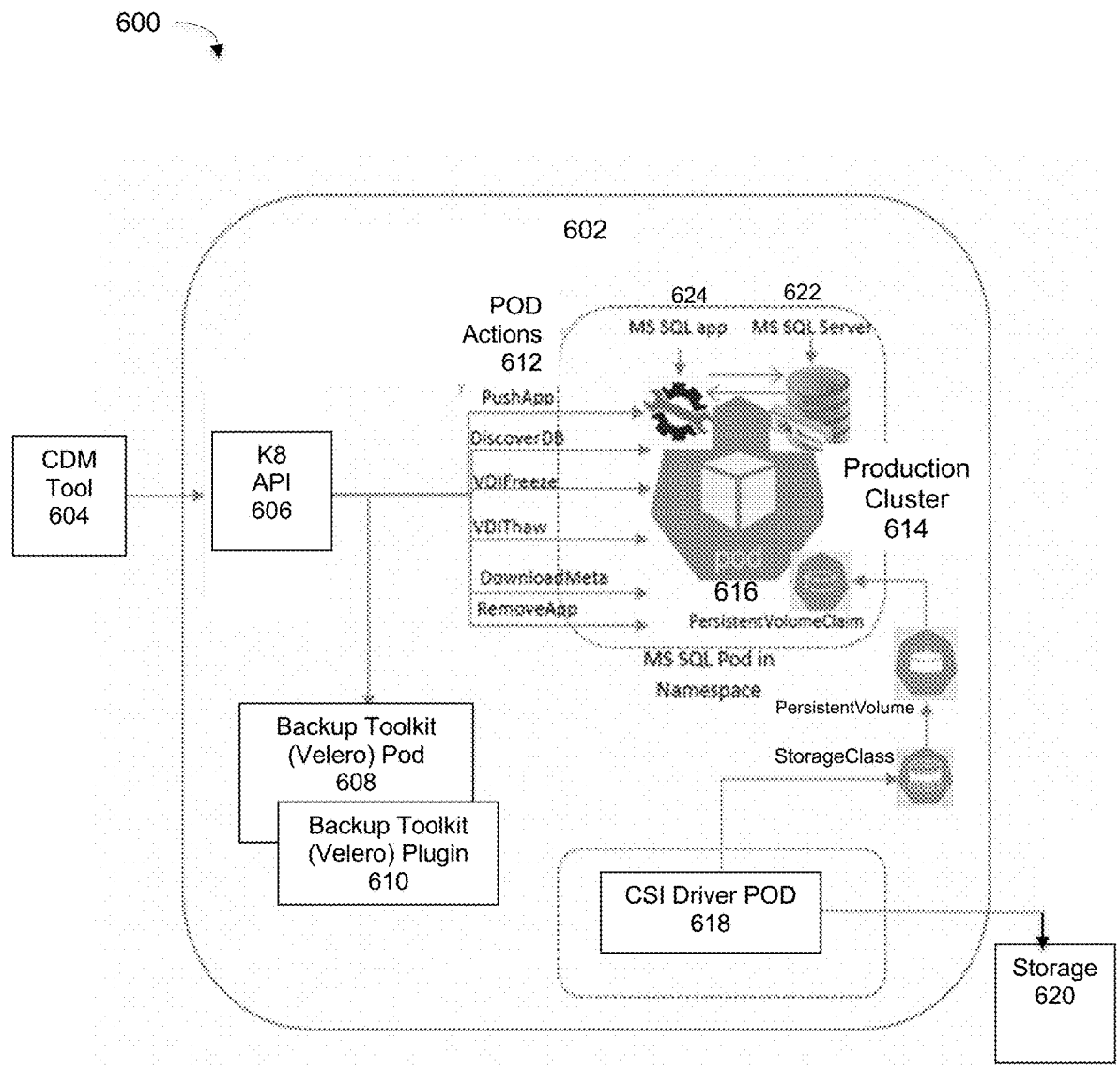
FIG. 6 illustrates a system for performing CDM toolkit operations on a production Kubernetes cluster, under some embodiments.

FIG. 6 illustrates CDM toolkit operations on a production Kubernetes cluster, under some embodiments. System 600 comprises a Kubernetes container 602 that contains a production cluster 614 with a pod 616. The CDM tool 604 accesses this pod through a Kubernetes API 606 to initiate certain pod actions 612, such as PushApp, DiscoverDB, VDIFreeze, VDIThaw, DownloadMetadata, and RemoveApp. The API 606 utilizes certain a backup (Velero) toolkit pod 608 and a toolkit plugin 610.

The production cluster 614 also contains a MS SQL Server 622 and an MS SQL Application 624, as well as a Persistent_Volume_Claim (PVC) for the pod 616. A CSI driver pod 618 coordinates storage of the cluster 614 data to the data storage media 620 through Storage_Class and Persistent_Volume data elements that reference the Persistent_Volume_Claim.

The CDM tool 604 and toolkit components discover all databases in the container 602, and freezes the databases to make snapshot copies of the production data. It then thaws the databases after the copy is done and pushes the toolkit onto a second container (e.g., a secondary workload container, such as recovery cluster shown in FIG. 7. This second container can then perform the recovery operation (as described in greater detail below) without impacting the production databases. The system thus takes a transaction consistent snapshot that is tied to a namespace and uses appropriate handles to ingest the data to a different cluster, in this case a recovery or other secondary workload cluster.

Figure 7:
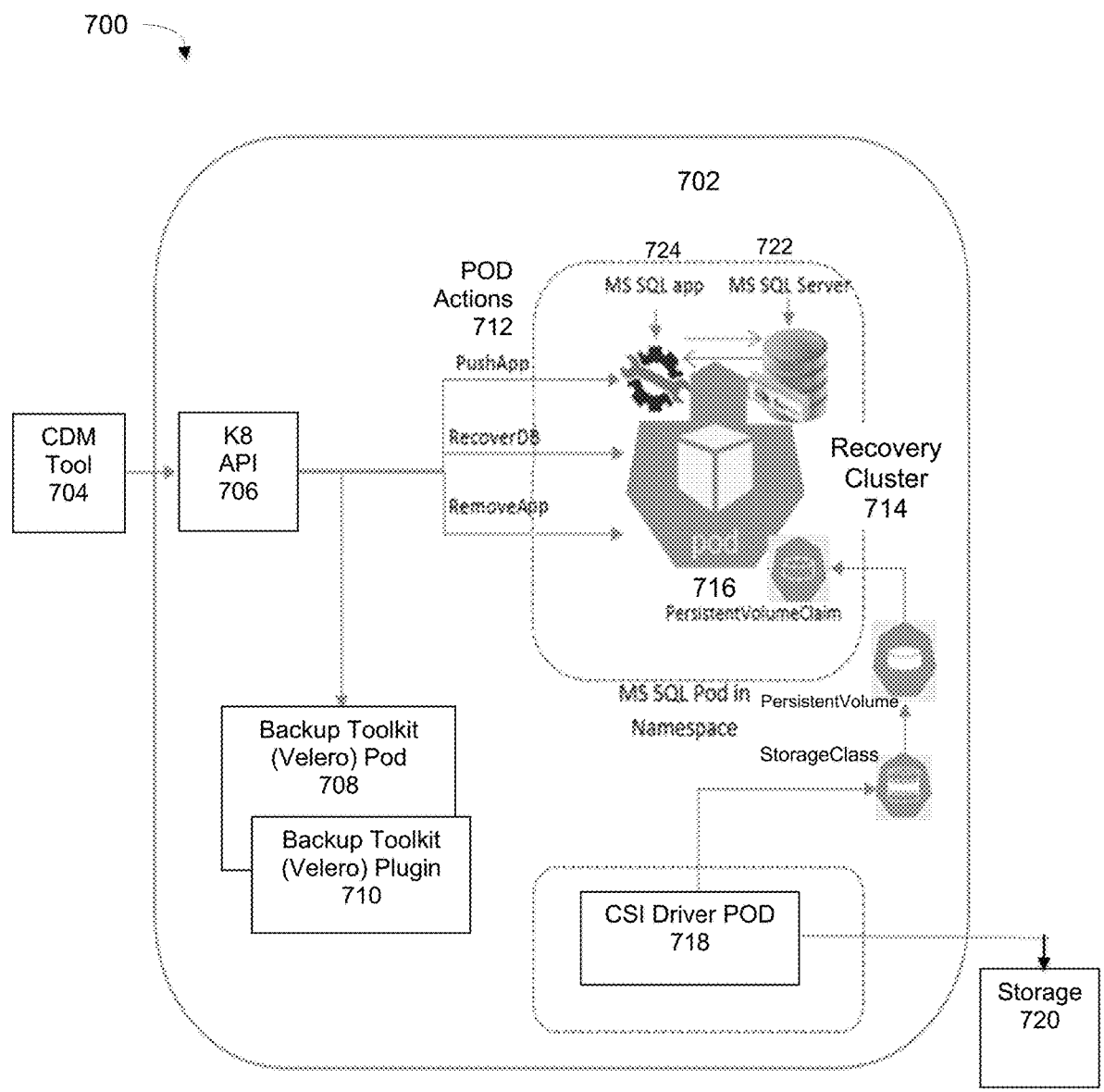
FIG. 7 illustrates a system for performing CDM toolkit operations on a recovery Kubernetes cluster, under some embodiments.

FIG. 7 illustrates CDM toolkit operations on a secondary load (recovery) Kubernetes cluster, under some embodiments. This could be the second container that receives the production (primary) workload data processed in system 600.

System 700 comprises a Kubernetes container 702 that contains a recovery cluster 714 with a pod 716. The CDM tool 704 accesses this pod through a Kubernetes API 706 to initiate certain pod actions 712, such as PushApp, RecoverDB, and RemoveApp. The API 706 utilizes certain a backup (Velero) toolkit pod 708 and a toolkit plugin 710.

The production cluster 714 also contains a MS SQL Server 722 and an MS SQL Application 724, as well as a Persistent_Volume_Claim (PVC) for the pod 716. A CSI driver pod 718 coordinates storage of the cluster 714 data to the data storage media 720 through Storage_Class and Persistent_Volume data elements that reference the Persistent_Volume_Claim.

FIG. 7 illustrates a container 702 for a secondary workload as a recovery cluster, however it should be noted that other secondary workloads can also be used, such as test and development, analytics, and so on.

Figure 8:
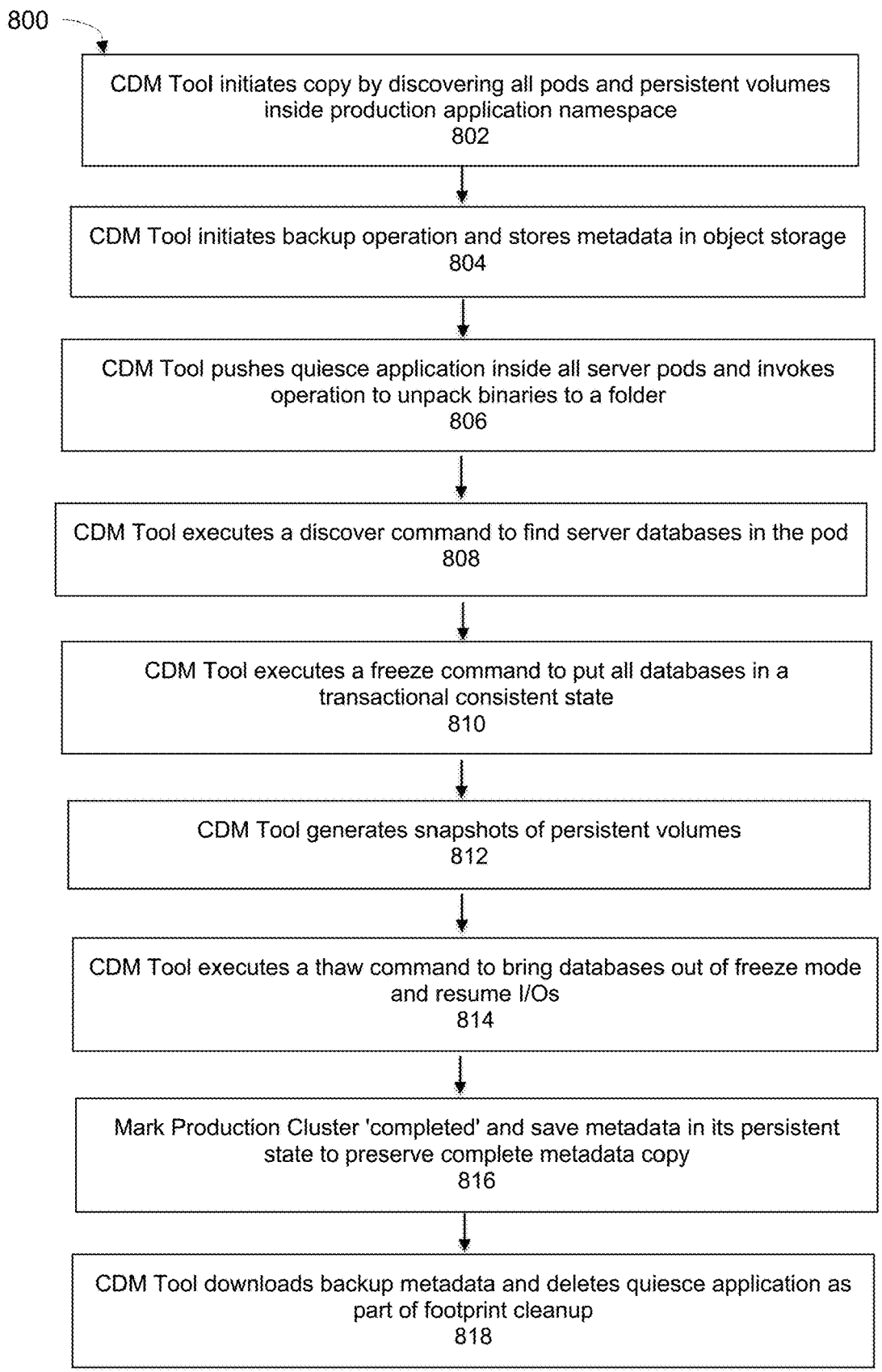
FIG. 8 illustrates a method comprising CDM toolkit operations on a production Kubernetes cluster, under some embodiments.

FIG. 8 is a flowchart that illustrates a method of implementing an application mobility solution that enables a copy for re-use of different Kubernetes clusters, under some embodiments. FIG. 8 basically illustrates a method comprising CDM toolkit operations on a production Kubernetes cluster, under some embodiments. Embodiments of FIG. 8 will thus be described in relation to the production cluster 602 of FIG. 6 for example purposes.

As shown in process 800, the CDM tool 604 first initiates the copy process by discovering all the MS SQL server 622 pods 616 and related persistent volumes inside the namespace where production application is deployed, 802. This is performed using a Kubernetes API, such as API 606.

Next, the CDM tool 604 initiates a metadata backup operation, 804. This step generally involves taking a copy of all the pod configurations (e.g., secret or public settings), services, and so on, inside the namespace) using VMware Velero (or backup toolkit) 608. This metadata backup is stored in an object storage which is accessible over network, 806. Any S3 compatible object store can be used, such as EMC ECS, Minio, AWS S3, etc.

Example programming code shown below can be used to trigger the metadata backup operation 804, under an embodiment. The same command can also be triggered via Kubernetes REST API.

```
bash$ velero backup create <backup_name> --storage-location <location
in object store to save backup> --include-namespaces <namespace to
backup> --exclude-resources= 'volumesnapshots, volumesnapshotcontents'
```

The CDM tool next pushes a copy of the quiesce application inside all the MS SQL server pods at a temporary (/tmp) location and invokes an operation (e.g., untar) which unpacks all the binaries packaged inside the tool to a folder (e.g.: /tmp/sqltool), 808. This is performed using the Kubernetes API 606.

The CDM tool now executes a discover command (e.g., /tmp/sqltools/discover.sh) to discover all the MS SQL server databases inside the pod 616, step 810. This is executed on all the MS SQL server pods in container 602. All the names of the discovered databases are stored in a list as a string, or similar data element.

The CDM tool next executes a freeze command (e.g., /tmp/sqltools/freeze.sh), 812, and passes the list of the databases discovered in step 810 above. This will internally use the VDI API calls and put all the databases in a transaction consistent state. Once all of the databases are frozen inside a MS SQL pod, the CDM tool 604 generates snapshots of the all the persistent volumes attached to the MS SQL pod by executing CSI snapshot calls, 814.

The CDM tool next executes a thaw command (e.g., /tmp/sqltools/thaw.sh), 816, and passes the list of the databases discovered in step 810 above. This will bring the databases out of the freeze mode and resumes all the I/Os in the database files. After this operation, the production cluster 614 is marked completed. The CDM tool now saves all the metadata(s) specific to the volume snapshot inside its persistence state, 818. This is required to preserve the complete copy metadata information (from steps 806 and step 814)

The CDM tool 604 next executes a Kubernetes API to download the backup metadata file and persist the downloaded file in its internal database. After this backup completion is acknowledged and the quiesce application which was pushed by the CDM tool in step 808 above is deleted as part of footprint cleanup, 818.

FIGS. 8 and 6 illustrated the operation of making transactional consistent snapshot copies of a production cluster. This process 800 is not necessarily a backup use case, but instead enables a copy for re-use by a secondary workload. Similar processes may also be performed for recovery operations by a recovery cluster, as illustrated in FIG. 7.

Figure 9:
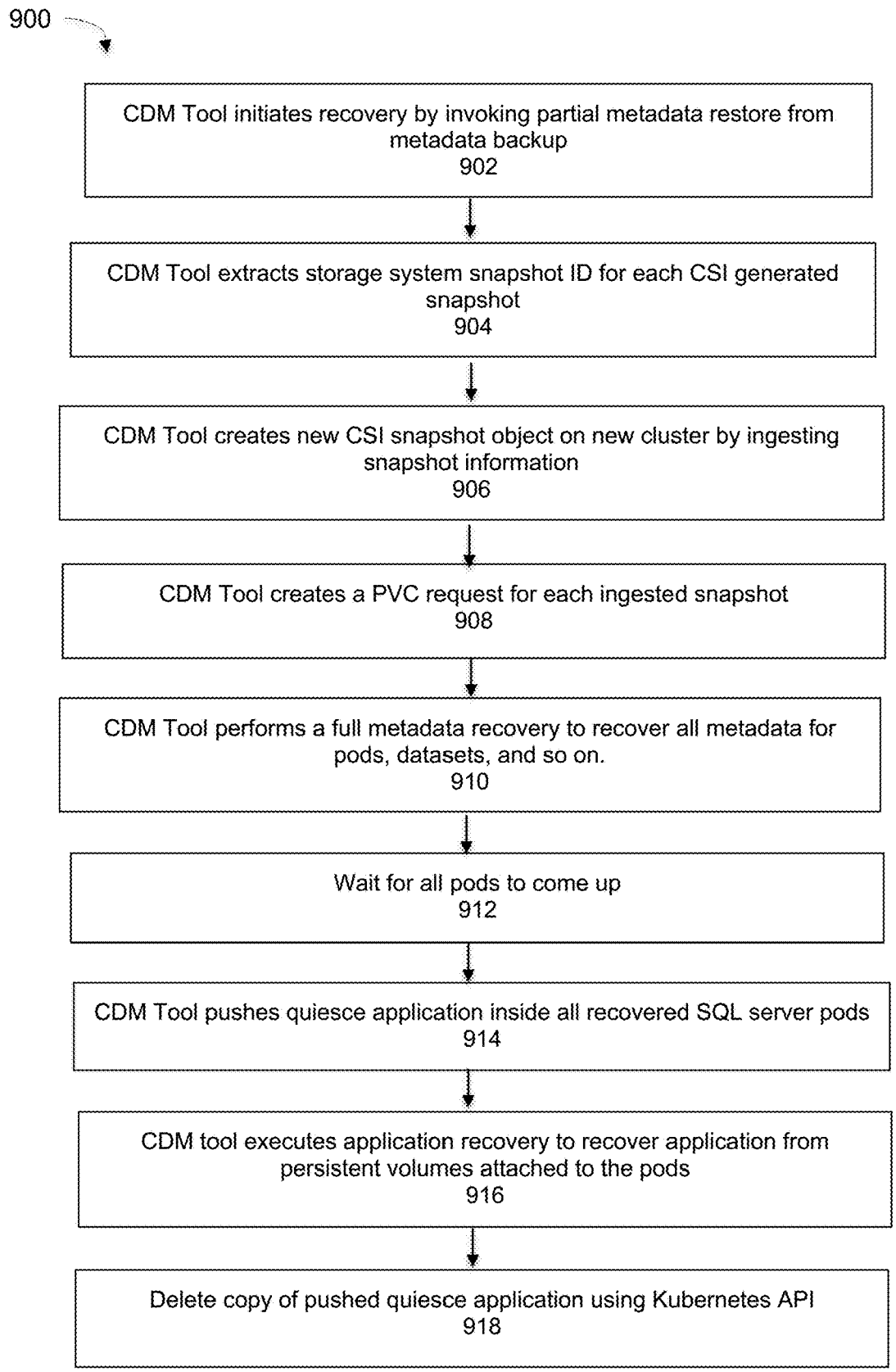
FIG. 9 illustrates a method comprising CDM toolkit operations on a recovery Kubernetes cluster, under some embodiments.

FIG. 9 illustrates a method of application recovery on a recovery Kubernetes cluster, under some embodiments. Embodiments of FIG. 9 will thus be described in relation to the recovery cluster 714 of FIG. 7 for example purposes. For recovery of a backup dataset, the CDM tool 704 starts (step 902) the application recovery on the new Kubernetes cluster by first invoking only partial metadata restore from the metadata backup created in step 804 of FIG. 8. This include just restoring the namespace object with a choice to keep the same name or a different name and all the services inside the namespace. Example programming code shown below can be used to perform initiate the restore (recovery) operation.

```
bash$ velero restore create  --from-backup <backup_name> --namespace-
mappings <old ns name>:<new ns name> --include-
resources='namespaces,services'
```

The CDM tool 704 next extracts (step 904) the storage system snapshot identifier information for each of the CSI generated snapshots generated in step 812 of FIG. 8. This can be done by reading the ".spec.volumeSnapshotRef.name" field of the associated volume snapshot content with every volume snapshot data element. This step 904 will be repeated for every snapshot created in step 812. Example programming code shown below can be used to perform this using the kubectl command.

```
bash$ kubectl get volumesnapshotcontent 'kubectl get volumesnapshot -
n <namespace> -o
jsonpath="{.items[0].status.boundVolumeSnapshotContentName}"' -o
jsonpath="{.spec.volumeSnapshotRef.name}"
```

Using the storage system snapshot identifier obtained above, the CDM tool creates new CSI snapshot object on the new Kubernetes cluster (target cluster for copy reuse), by ingesting the snapshot information, 906. This can be done by first creating a volume_snapshot_content object by ingestion and then provision a new CSI snapshot object from the volume_snapshot_content. This will be repeated for every snapshot information obtained in step 812. A sample YAML code segment to perform this operation is listed below:

```
apiVersion: snapshot.storage.k8s.io/v1beta1
kind: VolumeSnapshotContent
metadata:
    name: <snapcontent-name>
spec:
    deletionPolicy: Delete
    driver: csi-unity.dellemc.com
    volumeSnapshotClassName: <snapclass-name>
    source:
        snapshotHandle: <snaphandle name>
    volumeSnapshotRef:
        name: <snap-name>
        namespace: <new namespace>
---
apiVersion: snapshot.storage.k8s.io/v1beta1
kind: VolumeSnapshot
metadata:
    name: <snap-name>
    namespace: <new namespace>
spec:
    volumeSnapshotClassName: <snapclass-name>
    source:
        volumeSnapshotContentName: <snapcontent-name>
```

Using the snapshot object ingested in above, the CDM tool 704 creates a Persistent_Volume_Claim request for each of the ingested snapshots (Volume Snapshot), 908. This internally provisions a thin clone from each of the snapshot on the storage system and is an ideal suitable copy which is used for performing all the secondary (test/dev, copy reuse, etc.) workloads as well running the primary (production) workload operations. An example YAML file below shows how to provision a Persistent_Volume_Claim from Volume Snapshot, under an embodiment:

```
apiVersion: v1
kind: PersistentVolumeClaim
metadata:
    name: <claim name>
    namespace: <new namespace>
spec:
    storageClassName: <sc name>
    dataSource:
        name: <snap-name>
        kind: VolumeSnapshot
        apiGroup: snapshot.storage.k8s.io
    accessModes :
        - ReadWriteOnce
    resources:
        requests:
            storage: <capacity>
```

The CDM tool 704 now performs the full metadata recovery which recovers all the metadata for deployments, pods, stateful sets, secrets, configuration files, and so on, 910. The example programming code segment to perform this may be implemented as follows:

```
bash$ velero restore create  --from-backup engg-backup7--namespace-
mappings engg:devengg --exclude-
resources=PersistentVolumeClaims, PersistentVolumes
```

This step, 910 completes all the metadata and data recovery operations. The CDM tool then waits for all the pods to come up, 912. Once the pods are up, the CDM tool pushes a copy of the quiesce application inside all of the recovered MS SQL server pods at a temporary (e.g.,: /tmp) location, 914. It then invokes the untar operation which unpacks all the binaries packaged inside the tool to /tmp/sqltool folder. This is performed using Kubernetes API 706.

The CDM tool 704 then executes application recovery commands, such as by using the Kubernetes API and invoking the /tmp/sqltools/recover.sh (or similar) in each of the pods to recover the application from the persistent volumes attached to all the pods, 916. After this step application recovery is marked as completed. Once the recovery of SQL database is completed, the copy of application pushed in step 914 is deleted from all the recovered pods using the Kubernetes API by the CDM tool, 918.

Figure 10:
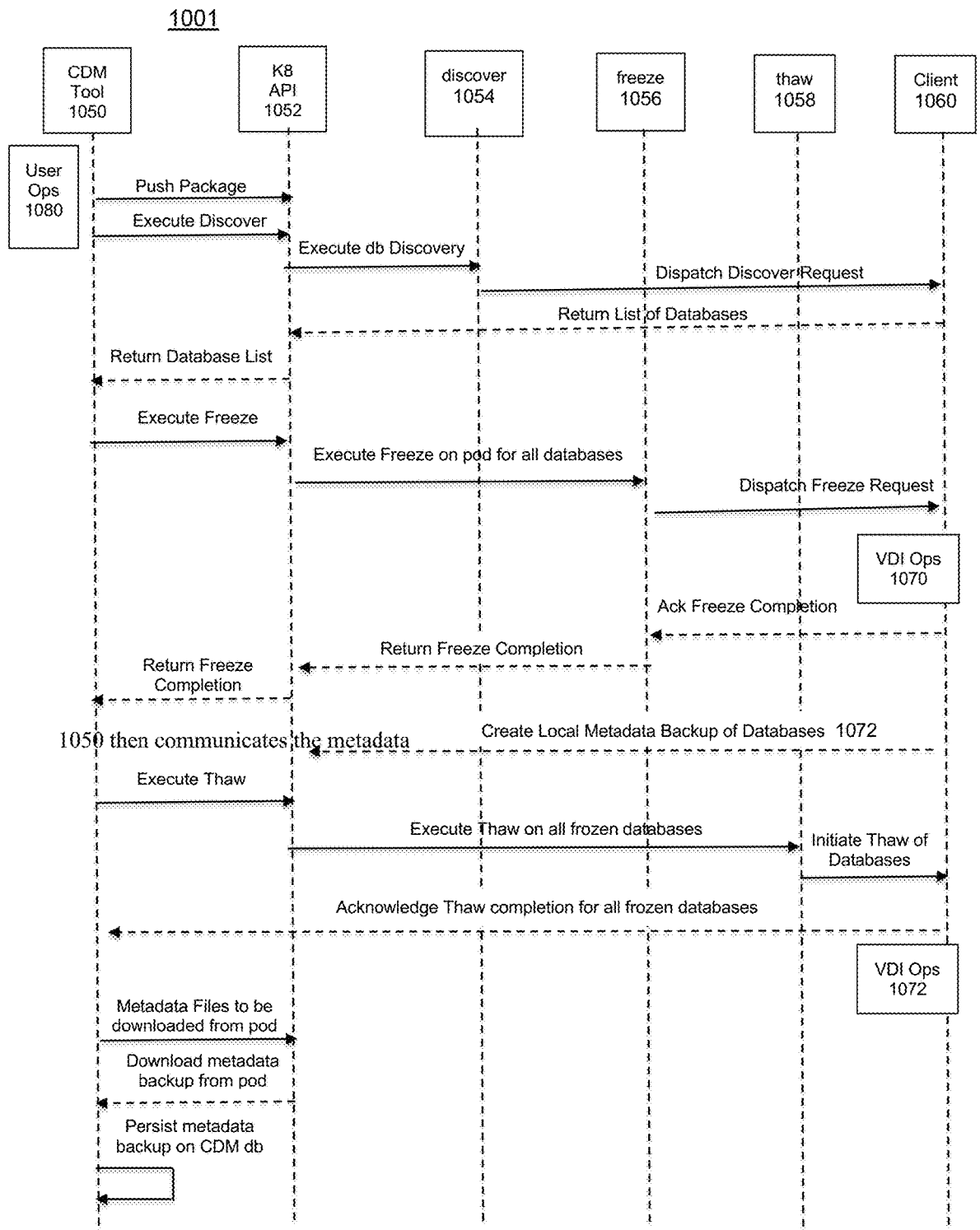
FIG. 10 is a sequence diagram illustrating operations of a CDM tool and Kubernetes API for a transactional consistent SQL copy process, under some embodiments.

FIG. 10 is a sequence diagram about interaction between CDM tool and a SQL application to make a transactional consistent copy of a SQL pod, under some embodiments. As shown in FIG. 10, diagram 1001 illustrates the interaction between a CDM tool 105, a Kubernetes API 1052 and a SQL client 1060 through the main commands of 'discover' 1054, 'freeze' 1056 and 'thaw' 1054.

A user initiates a pod backup through user operations 1080 on the CDM tool 1050. Upon this initiation, the CDM tool 1050 pushes a package to the pod with a tool comprising the SQL client, discover.sh, freeze.sh, and thaw.sh commands. The CDM tool executes the SQL client on the pod in the background listening for a request, and executes the discover command 1054 on the pod. The API 1052 then executes the database discovery. The discovery command 1054 dispatches a discover request to the client 1060, and in response, the client returns a list of databases back to the API 1052. The API then returns the database list to the CDM tool 1050.

The CDM tool 1050 next executes a freeze command on the pod for all databases. The API 1052 executes the database freeze command on all databases, and the freeze command 1056 is dispatched to the client 1060.

At this point certain virtual device operations can be performed. For VDI operations 1070, the system client 1060 creates virtual device per database using Virtual Device Interface (VDI). The VDI returns a created device identifier, the system client asks for device configuration, and the VDI returns the features per created device. The client then opens the device for transactions, and the VDI acknowledges the device open, at which point the freeze operation is complete. The client then acknowledges the freeze completion, and the freeze command 1056 returns the freeze complete message to the API 1052, which, in turn, sends it to the CDM tool 1050. An acknowledgement of freeze completion can then be sent to the user.

The client 1060 then creates a local metadata backup of the databases through the API 1052, as shown in step 1072. This can cause the client to initiate write commands to the VDI for the backup operation.

The CDM tool 1050 then executes a thaw command on the pod for all the databases, and the API 1052 executes the thaw command 1058, which initiates a thaw of the databases on the client 1060, which is then acknowledged back to the CDI tool. During the thaw process, certain VDI operations 1072 may also be executed, such as initiating and acknowledging backup completion from the VDI, and initiating and acknowledging cleanup and closing of the virtual device.

The CDM tool 1050 then communicates the metadata files to be downloaded from the pod, and the API 1052 downloads the metadata backup from the pod for the successfully thawed databases. The CDM tool then persists the metadata backup in the CDM database for use in recovery of the SQL databases. The backup complete operation can then be acknowledged back to the user.

Figure 11:
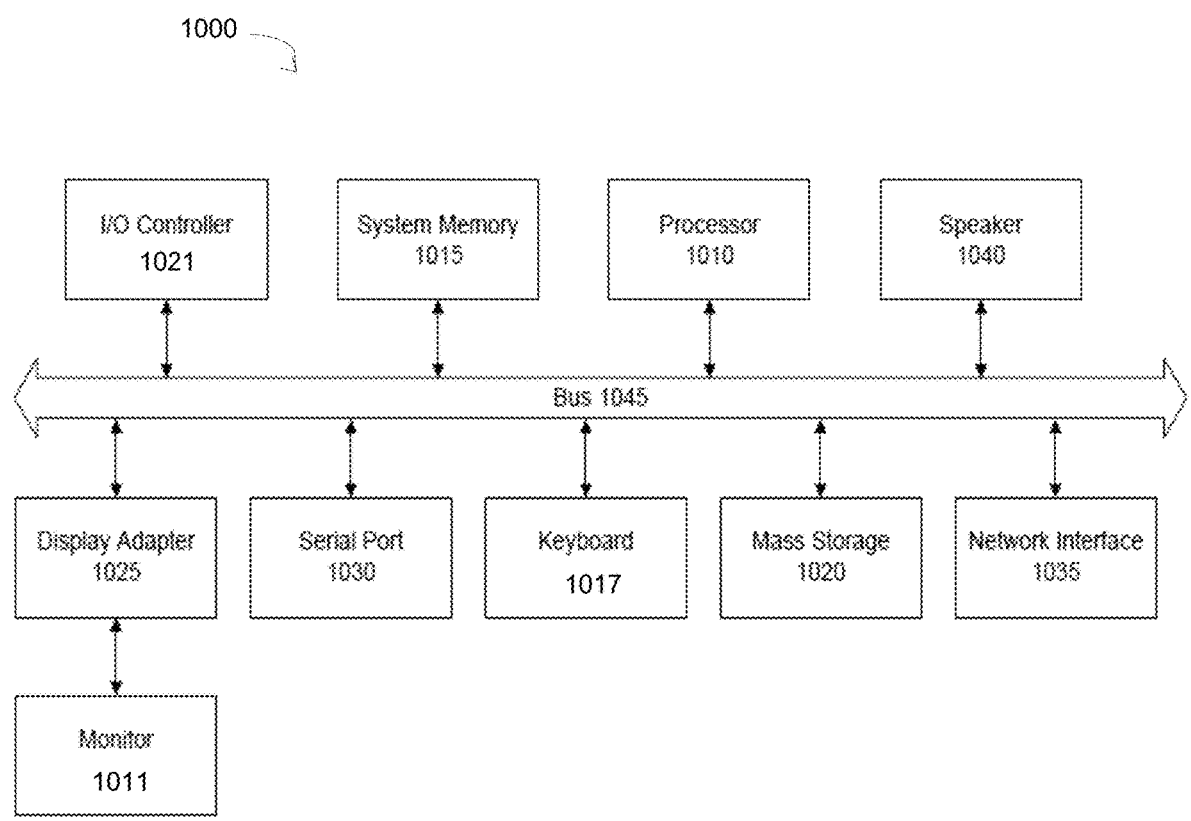
FIG. 11 is a block diagram of a computer system used to execute one or more software components of a transaction consistent snapshot copy process, under some embodiments.

FIG. 11 is a block diagram of a computer system used to execute one or more software components of the process described herein, under some embodiments. The computer system 1000 includes a monitor 1011, keyboard 1017, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®, family of systems (e.g., Windows Server), Linux, Mac™ OS X, IRIX32, or IRIX64. Other operating systems may be used.

Although certain embodiments have been described and illustrated with respect to certain example network topographies and node names and configurations, it should be understood that embodiments are not so limited, and any practical network topography is possible, and node names and configurations may be used.

Embodiments may be applied to data, storage, industrial networks, and the like, in any scale of physical, virtual or hybrid physical/virtual network, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform.

Some embodiments of the invention involve data processing, database management, and/or automated backup/recovery techniques using one or more applications in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Although embodiments are described and illustrated with respect to certain example implementations, platforms, and applications, it should be noted that embodiments are not so limited, and any appropriate network supporting or executing any application may utilize aspects of the backup management process described herein. Furthermore, network environment 100 may be of any practical scale depending on the number of devices, components, interfaces, etc. as represented by the server/clients and other elements of the network. For example, network environment 100 may include various different resources such as WAN/LAN networks and cloud networks 102 are coupled to other resources through a central network 110.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of producing transaction consistent snapshot copies of a SQL server container for copy reuse in a different container, comprising:
    pushing a quiesce application onto the SQL server container to discover database data on the SQL server container;
    locating one or more persistent volumes in a namespace in which the database data resides;
    temporarily stopping database operations of the SQL server to quiesce the database data;
    taking, by a copy data management (CDM) tool, a storage-array level volume snapshot of the database data to generate a transaction consistent snapshot that is tied to the namespace;
    using appropriate handles to ingest the database data to the different container to make an application-aware copy as a transaction consistent copy on the different container;
    re-starting the stopped database operations to unquiesce the database data; and
    removing the quiesce application from the SQL server container.

2. The method of claim 1 wherein the SQL server container comprises a production cluster used for business purposes and having real-world data that is regularly collected by running user and business applications.

3. The method of claim 2 wherein the different container comprises a secondary use cluster that is not accessible by end users.

4. The method of claim 3 wherein a secondary use of the secondary use cluster comprises one of: data backup, application test and development, reporting, or data analytics functions.

5. The method of claim 4 further comprising allowing the secondary use on the different container that does not impact data operations on the SQL server container.

6. The method of claim 1 wherein the volume snapshot comprises a storage system local snapshot process.

7. The method of claim 6 wherein the SQL server container and different container comprise Kubernetes clusters, and wherein the SQL server operates inside a Kubernetes pod.

8. The method of claim 7 wherein the quiesce application is managed by the CDM tool and executed as a background process.

9. The method of claim 8 wherein the CDM tool controls the SQL server through a Kubernetes application program interface (API) component.

10. The method of claim 1 further comprising using pod action commands on the server container including PushApp, DiscoverDB, Freeze, Thaw, RecoverDB, DownloadMetadata, and RemoveApp commands, and pod actions on the different container comprising PushApp, RecoverDB, and RemoveApp commands.

11. A method of producing transaction consistent snapshot copies of a production container for copy reuse in a recovery container, comprising:
    providing a copy data management (CDM) tool as an orchestrator in a Kubernetes environment to take a storage-array level volume snapshot copy of a database in the production container;
    deploying a backup toolkit in a namespace of the production container;
    providing a container system interface (CSI) plugin to provide persistent storage to the production container;
    posting the toolkit in the production container;
    performing a quiesce operation to stop input/output (I/O) operations to the database,
    taking, by the CDM tool, a storage-array level volume snapshot of the database data to generate a transaction consistent snapshot copy that is tied to the namespace,
    using appropriate handles to ingest the database data to the recovery container to make an application-aware copy as a transaction consistent copy on the recovery container, performing, after taking the snapshot copy, an unquiesce operation to allow the I/O operations; and
removing the toolkit from the production container.

12. The method of claim 11 wherein the transaction consistent copy is ingested to the recovery container to provide re-use of the database in a manner that does not impact data operations on the production container.

13. The method of claim 12 wherein the production container is used for business purposes and the database comprises real-world data that is regularly collected by running user and business applications.

14. The method of claim 11 wherein the quiesce and unquiesce operations are managed by the CDM tool and executed as a background process, and wherein the CDM tool controls the SQL server through a Kubernetes application program interface (API) component.

15. The method of claim 14 further comprising using pod action commands on the production container including PushApp, DiscoverDB, Freeze, Thaw, RecoverDB, DownloadMetadata, and RemoveApp commands, and pod actions on the recovery container comprising PushApp, RecoverDB, and RemoveApp commands.

16. A system for producing transaction consistent snapshot copies of a production container for copy reuse in a recovery container, comprising:
a copy data management (CDM) tool provided as an orchestrator in a Kubernetes environment to take a storage-array level volume snapshot copy of a database in the production container;
a backup toolkit implemented by a processor-based system and deployed in a namespace of the production container;
a hardware implemented container system interface (CSI) plugin deployed to provide persistent storage to the production container, and posting the toolkit in the production container, wherein the CDM tool takes a storage-array level volume snapshot of the database data to generate a transaction consistent snapshot copy that is tied to the namespace, and uses appropriate handles to ingest the database data to the recovery container to make an application-aware copy as a transaction consistent copy on the recovery container;
an application program interface (API) component performing, prior to taking the snapshot copy, a quiesce operation to stop input/output (I/O) operations to the database, and performing, after taking the snapshot copy, an unquiesce operation to allow the I/O operations; and
a hardware-based cleanup component removing the toolkit from the production container.

17. The system of claim 16 wherein transactional consistent backup provides re-use of the database in a manner that does not impact data operations on the production container, and wherein the production container is used for business purposes and the database comprises real-world data that is regularly collected by running user and business applications.

18. The system of claim 17 wherein the quiesce and unquiesce operations are managed by the CDM tool and executed as a background process, and wherein the CDM tool controls the SQL server through a Kubernetes application program interface (API) component.

19. The system of claim 18 further comprising using pod action commands on the production container including PushApp, DiscoverDB, Freeze, Thaw, RecoverDB, DownloadMetadata, and RemoveApp commands, and pod actions on the recovery container comprising PushApp, RecoverDB, and RemoveApp commands.

20. The system of claim 16 wherein the volume snapshot copy comprises a copy made by a storage system local snapshot process.

* * * * *